United States Patent
Du et al.

(10) Patent No.: US 12,494,509 B2
(45) Date of Patent: Dec. 9, 2025

(54) NON-AQUEOUS AMMONIA ELECTROLYTES FOR LITHIUM ANODE BASED PRIMARY AND RESERVE BATTERIES

(71) Applicants: Lin-Shu Du, Lansdale, PA (US); Natalie Aulicino, Cinnaminson, NJ (US); Art Driedger, Spring City, PA (US); James Pastore, Collegeville, PA (US); Giuseppe Di Benedetto, Nutley, NJ (US); Jeff Swank, Montgomery Village, MD (US)

(72) Inventors: Lin-Shu Du, Lansdale, PA (US); Natalie Aulicino, Cinnaminson, NJ (US); Art Driedger, Spring City, PA (US); James Pastore, Collegeville, PA (US); Giuseppe Di Benedetto, Nutley, NJ (US); Jeff Swank, Montgomery Village, MD (US)

(73) Assignee: MAXPOWER, INC., Harleysville, PA (US)

( * ) Notice: Subject to any disclaimer, the term of this patent is extended or adjusted under 35 U.S.C. 154(b) by 102 days.

(21) Appl. No.: 17/300,843

(22) Filed: Nov. 23, 2021

(65) Prior Publication Data
US 2023/0163358 A1 May 25, 2023

(51) Int. Cl.
| | | |
|---|---|---|
| *H01M 10/0569* | (2010.01) | |
| *H01M 4/38* | (2006.01) | |
| *H01M 4/62* | (2006.01) | |
| *H01M 10/0568* | (2010.01) | |
| *H01M 50/414* | (2021.01) | |
| *H01M 50/429* | (2021.01) | |
| *H01M 50/437* | (2021.01) | |

(52) U.S. Cl.
CPC ....... *H01M 10/0569* (2013.01); *H01M 4/382* (2013.01); *H01M 4/621* (2013.01); *H01M 4/625* (2013.01); *H01M 10/0568* (2013.01); *H01M 50/414* (2021.01); *H01M 50/4295* (2021.01); *H01M 50/437* (2021.01); *H01M 2300/002* (2013.01)

(58) Field of Classification Search
CPC .................................................. H01M 10/0569
See application file for complete search history.

(56) References Cited

U.S. PATENT DOCUMENTS

| | | | |
|---|---|---|---|
| 3,082,284 A | 3/1963 | Mount | |
| 3,202,548 A * | 8/1965 | Adlhart | H01M 6/38 429/188 |
| 3,445,295 A | 5/1969 | Smith et al. | |

(Continued)

FOREIGN PATENT DOCUMENTS

KR 1465018 B1 * 11/2014

OTHER PUBLICATIONS

U.S. Appl. No. 17/300,205 High Voltage Cathode Mater for Ammonia Battery.

*Primary Examiner* — Stephan J Essex

(57) ABSTRACT

Novel, non-aqueous, high salt concentration ammonia based electrolytes, compatible with lithium based anodes are described therein. Said electrolytes are supporting higher voltage provided by novel cathodes and lithium based anodes, which results in high power density batteries over prior art. Various cathodes, separators and cell constructions are also disclosed.

11 Claims, 5 Drawing Sheets

(56) References Cited

U.S. PATENT DOCUMENTS

| | | |
|---|---|---|
| 3,943,001 A | 3/1976 | Miles |
| 2016/0344063 A1* | 11/2016 | Chang .................. H01M 4/525 |
| 2019/0123347 A1* | 4/2019 | Kim ..................... H01M 4/485 |
| 2021/0399283 A1* | 12/2021 | Khokhlov ............. H01M 4/244 |
| 2022/0006075 A1* | 1/2022 | Kovacs ............... H01M 10/054 |
| 2023/0187623 A1* | 6/2023 | Yadav ................... H01M 4/62 |
| | | 429/224 |

* cited by examiner

NON-AQUEOUS AMMONIA ELECTROLYTES FOR LITHIUM ANODE BASED PRIMARY AND RESERVE BATTERIES

BACKGROUND OF THE INVENTION

Field of the Invention

This invention relates to low temperature, high power primary and reserve batteries having ammonia based electrolyte and lithium anode.

These batteries have higher cell voltage output and higher power density at low temperatures than existing ammonia based batteries, due to the use of ammonia electrolyte with high salt concentration that permits the use of lithium anode instead of prior art magnesium anode.

DESCRIPTION OF THE PRIOR ART

It has been recognized that there is a need for higher energy density and higher power reserve batteries working at very low temperature and having extremely fast activation time (10-300 ms).

Prior art ammonia based batteries have magnesium as the anode and meta-dinitrobenzene (m-DNB) as the cathode, resulting in 2 V cell voltage and having relatively low power output and thus larger and more cells are needed in a final battery assembly.

Due to corrosiveness of the ammonia electrolyte, practical applications are limited to reserve batteries. Low viscosity of liquid ammonia at low temperature (for example, −0.35 cP at −55° C.) provides extremely fast activation time (10-30 ms).

In addition, due to the strong solvation ability of the nitrogen longer pair in the ammonia molecule, the conductivity of an ammonia based electrolyte is usually high over a wide temperature range. This permits ammonia based batteries to operate at high rate (>20 mA/cm$^2$) at temperature ranging from −55 to +75° C.

The development has shown that the 2 V cell voltage can be obtained via the use of m-DNB cathode and Mg anode. There is a demand for miniature reserve battery applications, such as medium calibers, which requires low temperature and high rate operations with extremely fast activation at small footprint and higher cell voltage. The higher voltage improves power density and lowers the cost. Therefore, there is a need for improving ammonia based cell load voltage to be higher than 2 V.

One way to improve cell voltage is to identify cathode materials having higher redox potentials and compatible with ammonia based electrolyte.

Our recently filed patent application Ser. No. 17/300,205, has shown that by selecting cathode materials, the ammonia based cell load voltage can be increased above 2.5 V. Current anode for the ammonia battery is based on magnesium. Replacing magnesium by other electropositive metals having lower reduction potential can also additionally increase the cell operating voltage.

It is well-known that when an alkali metal or alkali earth metal is in contact with ammonia, metal becomes metal ion and electron(s) solvated in ammonia. The ammonia solvated electron is very reactive and can be dangerous when in contact with an oxidant such as a cathode material.

So far magnesium is the only one of electropositive metals that can be used as an anode in ammonia based electrolyte without the formation of solvated electron.

Lithium has a lowest reduction potential and therefore using lithium as the anode additionally increases the cell operating voltage. However, lithium dissolves in ammonia and forms solvated electron as so-called lithium blue.

Therefore, until now there is no lithium based ammonia battery with high cell voltage which has been developed successfully.

Prior art ammonium based batteries are described in the U.S. Pat. Nos. 3,445,295, 3,082,284 and 3,943,001, as examples.

SUMMARY OF THE INVENTION

It has now been found that the use of ammonia electrolyte with high salt concentrations can be compatible with lithium without the formation of lithium blue. This permits the use of lithium anode resulting in higher cell operating voltages than the cell made with magnesium anode.

The use of lithium anode provides higher load voltages and reduce number of cells in a battery.

The benefits of higher voltages also include the decrease of battery size and reduction of inter cell leakage, and increased power output of the battery.

The higher voltage is possible by using lithium anode and ammonia based electrolyte with at least one salt from the group including LiPF$_6$, LiBF$_4$, LiSCN, NH$_4$SCN, KSCN and LiNO$_3$, and having salt concentration higher than 20%.

Ammonia based primary and reserve batteries of the invention comprise: an alkali metal or alkali earth metal anode(s), (preferably lithium), in contact with a tabbed current collector; a cathode(s) being reduced upon discharge, such as a persulfate based salt like (NH$_4$)$_2$S$_2$O$_8$, or K$_2$S$_2$O$_8$, or Na$_2$S$_2$O$_8$, coated on and in contact with stainless steel current collector; a separator between the anode and cathode, such as 90% porous glass non-woven paper; and an electrolyte, such as ammonia NH$_3$ with a salt, such as KSCN, in a separate pressure ampoule.

The battery is in a sealed housing and is stored dry, and is activated by the electrolyte by mechanically punching the wall of the ampoule, which is placed next to the battery. The activation is done only when the battery is needed to power a device. The battery may be multi-celled.

The above cathodes may be coated on a current collector by well known various methods via a slurry, comprising the active material, plastic binder, and conductive carbon powder in a solvent, which solvent evaporates after coating.

The persulfate cathodes may be also replaced by a dinitrobenzene based cathode, permanganate based cathode, or by molybdenum oxide based cathode.

The principal object of the invention is to provide low temperature, high energy and power ammonia electrolyte based battery, having higher load voltage and thus less cells over prior art, and thus reducing the size and cost of the battery assembly.

A further object of the invention is to provide high salt concentration ammonia electrolyte to enable the use of alkali and alkali earth metals, such as lithium, having higher reduction potentials than the current state of art magnesium.

Another object of the invention is to provide high power density ammonia based battery at low operating temperature for the military.

Other objects and advantages of the invention will be apparent from the description and claims.

BRIEF DESCRIPTION OF THE DRAWINGS

The nature and characteristic features of the invention will be more readily understood from the following description taken in connection with the accompanying drawing forming part thereof, in which.

It should, of course, be understood that the description and drawings herein are merely illustrative, and that various modifications and changes can be made in the compositions and the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function substantially same way to bring about the same results.

Figure 1:
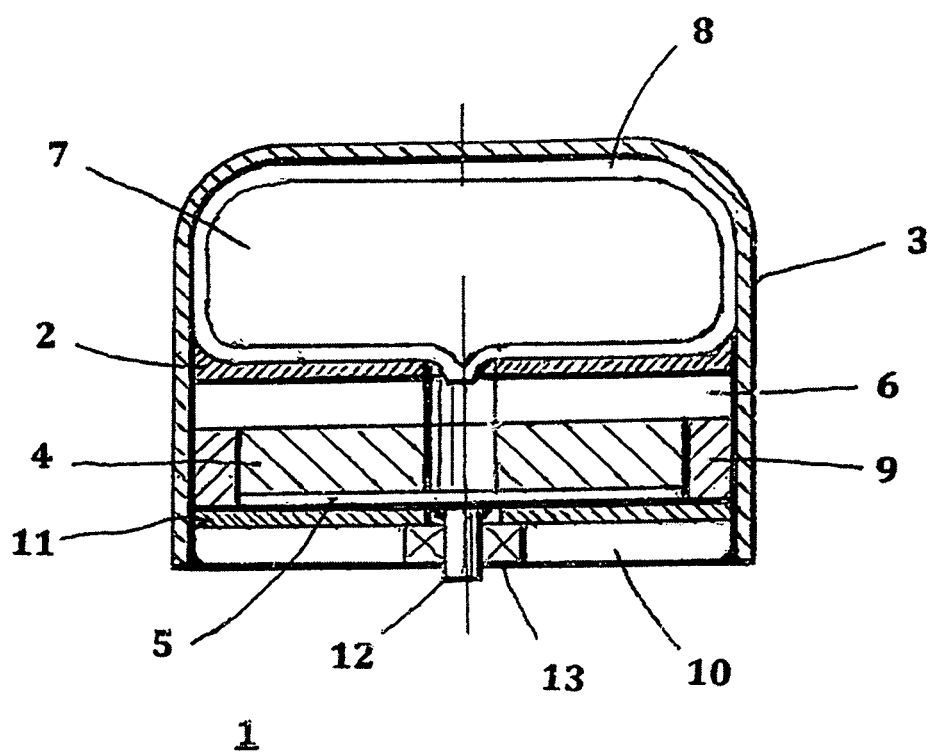
FIG. 1 is a sectional side elevational view of cylindrical ammonia based primary or reserve battery, having flat circular electrodes and the electrolyte in the ampoule placed on top of the cells.

Referring now to the FIG. 1, which is one embodiment of the invention, showing ammonium based low temperature primary or reserve battery 1 of the invention, as an example, which battery comprises: a circular lithium foil anode 2; in contact with a cylindrical metal enclosure/current collector 3; a cathode 4, such as persulfate based salt like (NH$_4$)$_2$S$_2$O$_8$, or K$_2$S$_2$O$_8$, or Na$_2$S$_2$O$_8$, or coated on a tabbed stainless steel collector 5 and in contact with the cathode 4; a separator 6, such as 90% porous non-woven glass paper, between said anode 2 and cathode 4; and an electrolyte 7, such as ammonia NH$_3$ with a salt like KSCN dissolved therein, and the electrolyte is stored in a separate pressure ampoule 8, preferably of a glass material, placed next to the battery components 2 and 6. The cathode 4 with collector 5 is insulated by non-conductive ring 9.

The battery 1 is sealed dry in moisture-proof metal enclosure 3, with metal plug 10, insulating layer 11, and positive metal pin 12, welded to the collector 5 and sealed by glass seal 13. The battery 1 is activated by mechanically punching the wall of the ampoule 8. The activation is done only when the battery 1 is needed to power a device.

The battery may be multi-celled with the cells connected in parallel. (not shown).

All structures are heat and pressure and corrosion resistant.

Other cells' constrictions may be also used with the electrolyte of the invention, as described in our prior patent application Ser. No. 17/300,205, and in prior art U.S. Pat. Nos. 3,45,295; 3,032,284 and 3,943,001, which are hereby incorporated by reference.

The cathodes 4 described in FIG. 1 may be coated on the collector 5 by well known various methods via a slurry comprising the active material, plastic binder, and conductive carbon powder in a solvent, which solvent evaporates after coating. Additionally, the described material persulfate salt of the cathode 4 may be replaced by molybdenum oxide, a permanganate, meta-dinitrobenzene, or their mixtures.

The battery electrolyte of the invention is ammonia-based non-aqueous electrolyte, and comprises NH$_3$ solvent with at least one salt selected from the group including: LiPF$_6$, LiBF$_4$, LiTFSI, LiSCN, NH$_4$SCN, KSCN and LiNO$_3$, dissolved therein with salt concentration ranging from 10% to 80%, which is another embodiment of the invention.

The cathode's persulfate salt of the invention has a general structure represented by the formula: X$_2$S$_2$O$_8$, wherein X is representative of a cation with an ionic charge 1+ (such as Na$^+$, K$^+$, NH$_4^+$) with associated anion of S$_2$O$_8^{2-}$.

The cathode active materials may have a fibrous binder with conductive carbon powder and may be also in a pad form, and said pad is in contact with a conductive substrate, which is another embodiment of the invention.

In another embodiment of the invention, the cathode active materials with a binder and conductive carbon powder may be in a free-standing form, casted onto a conductive substrate.

In another embodiment of the invention, the cathode active materials with a binder and conductive carbon powder may be as a free-standing sheet pressed onto a conductive substrate.

The separators in the described batteries of the invention may be also made from a porous polymer, or a porous cellulose paper, or a solid state ion conductive film.

Figure 2:
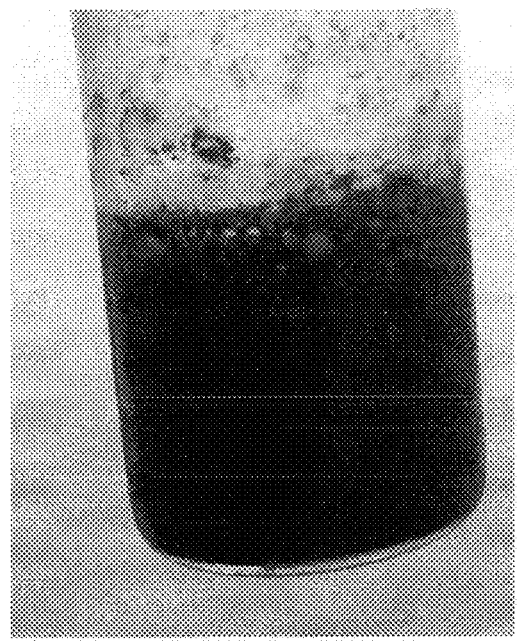
FIG. 2 is the image that was taken 1 minute after a piece of lithium metal was dropped into a liquid ammonia that was cooled in acetone-dry ice bath (at about −78° C.) before the image was taken. The deep blue color indicates the formation of solvated electron-lithium blue.

FIG. 2 shows the formation of lithium blue when lithium is in contact with ammonia.

Figure 3:
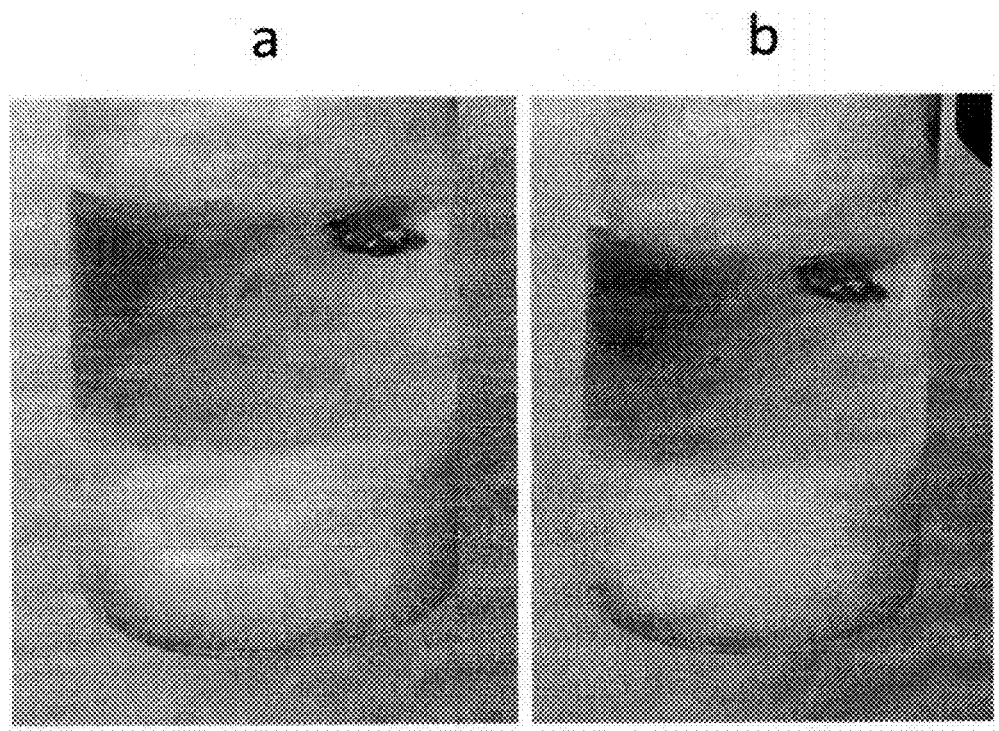
FIG. 3 includes the images that were taken (a) 1 minute and (b) 8 minutes after a piece of lithium metal was dropped into a saturated solution of KSCN in liquid ammonia that was cooled in acetone-dry ice bath (at about −78° C.) before the images were taken.

FIG. 3 demonstrates that lithium is stable in concentrated KSCN/NH$_3$ solution. No lithium blue was observed even after 8 minutes.

Figure 4:
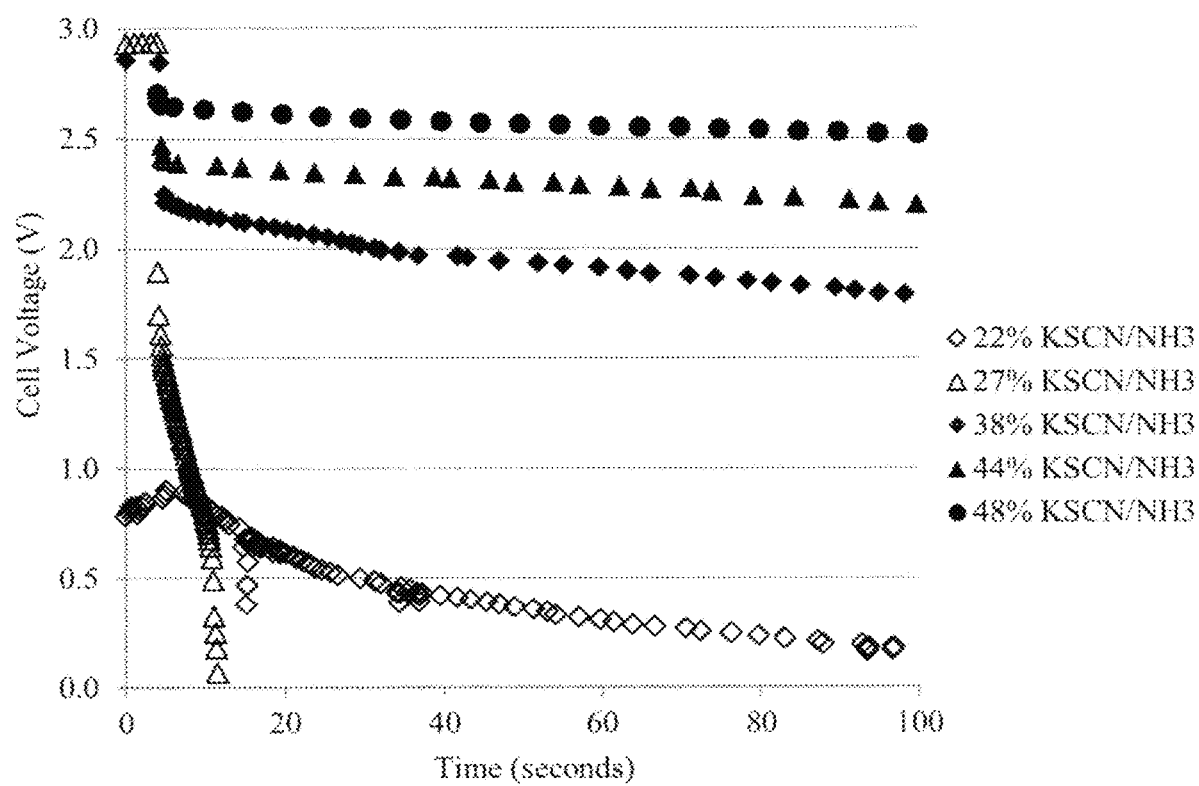
FIG. 4 is a discharge time (first 100 seconds) versus voltage diagram for cells made with ammonia persulfate cathodes and lithium anodes, activated with ammonia electrolyte having various KSCN concentrations, and discharged at 40 mA/cm$^2$.

FIG. 4 indicates the load voltage is greatly improved when a higher salt concentration electrolyte is used.

Figure 5:
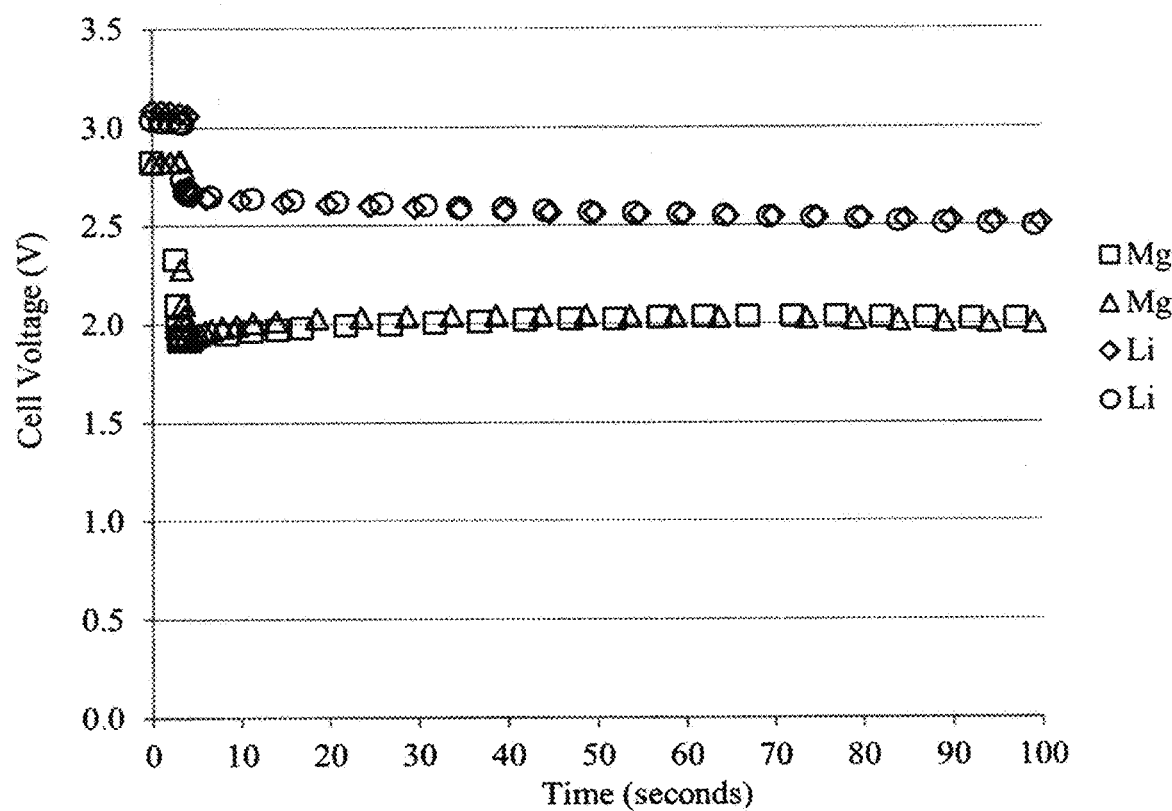
FIG. 5 is a discharge time (first 100 seconds) versus voltage diagram for cells made with ammonia persulfate cathodes, with magnesium and lithium based anodes, activated by 48% KSCN/NH$_3$ electrolyte, and discharged at 40 mA/cm$^2$.

FIG. 5 shows the lithium anode based cell has higher voltage than the magnesium anode based cell. The load voltage gain is more than 0.5 V when replacing magnesium anode with lithium anode.

It will thus be seen that the high salt concentration ammonia electrolyte can improve its compatibility with lithium and provides high voltage and high power density. Thus lithium based ammonia batteries have been provided herein, with which the objects of the invention are achieved.

We claim:

1. A non-aqueous reserve battery having ammonia based electrolyte with an electrolyte salt concentration at least 21% by weight, a lithium metal based anode, a porous electrically non-conductive separator and a cathode, which cathode's active materials are selected from the group including persulfate salt, molybdenum oxide, a permanganate, meta-dinitrobenzene and mixtures thereof.

2. A non-aqueous reserve battery having ammonia based electrolyte and lithium metal based anode as described in claim 1, in which said cathode active material is a persulfate salt, which has a general structure represented by the formula: X$_2$S$_2$O$_8$, wherein X is a cation with an ionic charge 1+ selected from the group including: Na$^+$, K$^+$, and NH$_4^+$ with associated anion of S$_2$O$_8^{2-}$.

3. A non-aqueous battery as described in claim 1, in which said cathode active material with a binder and conductive carbon powder is coated on a conductive current collector.

4. A non-aqueous battery as described in claim 1, in which said cathode active material with a fibrous binder and carbon conductive powder included therein is in a pad form, and said pad is in contact with a conductive substrate material.

5. A non-aqueous battery as described in claim 1, in which said cathode active material with a binder and conductive carbon is pressed onto a conductive substrate material.

6. A non-aqueous reserve battery as described in claim 1, which battery has horizontally stacked flat circular electrodes.

7. A non-aqueous reserve battery as described in claim 1, which battery is in a cylindrical form having said cathode wound.

8. A non-aqueous battery as described in claim 1, in which battery said separator(s)' material is a porous glass non-woven paper.

9. A non-aqueous battery as described in claim 1, in which battery said separator(s)' material is a porous cellulose fiber paper.

10. A non-aqueous battery as described in claim 1, in which battery said separator(s)' material is a porous polymer film.

11. A non-aqueous ammonia based electrolyte for lithium metal anode based reserve batteries, comprising non-aqueous ammonia $NH_3$ with at least one salt selected from the group including $LiBF_4$, $LiPF_6$, LiTFSI, LiSCN, $NH_4SCN$, KSCN and $LiNO_3$ dissolved therein, having salt concentration of at least 46% by weight.

\* \* \* \* \*